United States Patent [19]

Block

[11] Patent Number: 4,984,335
[45] Date of Patent: Jan. 15, 1991

[54] APPARATUS FOR TRANSPORTING TEXTILE LAPS

[75] Inventor: Karl-Heinz Block, Stuttgart, Fed. Rep. of Germany

[73] Assignee: Zinser Textilmaschinen GmbH, Ebersbach-Fils, Fed. Rep. of Germany

[21] Appl. No.: 425,710

[22] Filed: Oct. 20, 1989

[30] Foreign Application Priority Data

Oct. 25, 1988 [DE] Fed. Rep. of Germany ....... 3836242

[51] Int. Cl.$^5$ ............................................. D01G 19/08
[52] U.S. Cl. ................................... 19/65 A; 19/65 R; 19/115 R
[58] Field of Search ................. 19/65 A, 65 R, 115 R

[56] References Cited

U.S. PATENT DOCUMENTS

| | | | |
|---|---|---|---|
| 3,388,432 | 6/1968 | Saikawa et al. | 19/115 R |
| 3,440,688 | 4/1969 | Yamamoto et al. | 19/65 R |
| 3,904,050 | 9/1975 | Kimura et al. | 214/89 |
| 4,528,721 | 7/1985 | Hera | 19/65 R |
| 4,890,358 | 1/1990 | Marzoli | 19/115 R |

FOREIGN PATENT DOCUMENTS

| | | |
|---|---|---|
| 3536702A1 | 4/1987 | Fed. Rep. of Germany . |
| 3532002A1 | 6/1987 | Fed. Rep. of Germany . |
| 3601832A1 | 7/1987 | Fed. Rep. of Germany . |
| 419144 | 5/1966 | Japan ................................. 19/65 A |
| 572529 | 2/1976 | Switzerland . |
| 1058925 | 2/1967 | United Kingdom ............... 19/65 A |

OTHER PUBLICATIONS

Zinser Novum Tecnologie in Garn; Zinser Textilmaschinen GmbH, D-7333 Ebersbach/Fils, West Germany.

Primary Examiner—Werner H. Schroeder
Assistant Examiner—Michael A. Neas
Attorney, Agent, or Firm—Shefte, Pinckney & Sawyer

[57] ABSTRACT

Apparatus for transporting full textile laps to a plurality of combers includes an elevated bridge structure movable in series between a lap storage station and the plural combers, a trolley movable along the bridge structure, and a lap gripping device suspended from the trolley for carrying a full replacement lap. The bridge structure is provided with a detector for each work station of each comber to recognize detectable elements at the work stations which are normally obscured by laps supported thereat but are uncovered when the laps are depleted to a sufficient extent that a replacement lap is required. Upon recognizing the detectable elements at any work station, the associated detector element transmits a signal to a controller which actuates the gripping mechansim to deposit a full replacement lap at the work station.

10 Claims, 3 Drawing Sheets

APPARATUS FOR TRANSPORTING TEXTILE LAPS

BACKGROUND OF THE INVENTION

The present invention relates broadly to an apparatus for transporting textile laps to a plurality of combers and, more particularly, to such a lap transporting apparatus utilizing a movable elevated bridge structure equipped with a lap gripping device for carrying textile laps from a lap storage station to the work stations of the combers.

Textile laps comprise a loosely compressed batt of cotton fibers produced by a picker, lapper or other suitable lap preparing machinery and wound about a central tubular supporting core. A conventional textile combing machine, commonly referred to as a comber, is typically equipped with a plurality of work stations each of which has a first position at which a wound lap is supported for unwinding from its core for accomplishment of the combing process and a second position at which a full lap is supported for temporary storage awaiting replacement of the active lap at the first position upon its exhaustion.

Lap transporting apparatus of the aforementioned type are known for delivering fully wound laps to the work stations of a series of combers so that the combing operation can progress on a generally continuous basis. Such transporting apparatus provides a trackway extending along the series of combers at an elevation thereabove with the bridge structure supported on the elevated trackway for traveling movement therealong. A trolley is mounted on the bridge structure for traveling movement along its lengthwise extent transverse to the direction of traveling movement of the bridge structure and a lap gripping mechanism is suspended from the trolley for selective gripping engagement with a fully wound lap for carrying laps to, and depositing laps at, the work stations of the combers.

In such lap transporting apparatus, a suitable control system must be provided for communication between the combers and the assembly of the bridge structure, the trolley and the gripping mechanism to identify the work stations of the combers to which replacement laps must be delivered and to transmit such information to the traveling bridge structure, the trolley and the gripping mechanism to control their respective movements to accomplish gripping, transportation and deposit of replacement laps at the identified work stations. Conventional control systems for accomplishing this purpose are relatively expensive.

SUMMARY OF THE INVENTION

It is accordingly an object of the present invention to provide a lap transporting apparatus of the aforementioned type with a system for controlling the operations of the elevated bridge structure, the trolley and the gripping mechanism in a simple manner for delivering full replacement laps to the combers as necessary. According to the present invention, this object is fundamentally achieved by providing the bridge structure of the lap transporting apparatus with suitable means for detecting empty lap storage positions of the combers whereat full replacement laps are to be supplied.

In the present lap transporting apparatus, the bridge structure together with the trolley and gripping mechanism associated therewith continuously travel along the elevated trackway while the detecting means of the bridge structure monitors the work positions of the combers to identify when the active lap at a work station is exhausted and replaced by the associated full replacement lap, whereupon the detecting means initiates transportation and deposit of a new replacement lap at the lap storage position of the identified work station. Advantageously, no wiring or other connections are required between the individual combers and the elevated bridge structure, the trolley or the gripping mechanism for transmitting control signals as in known lap transporting apparatus.

According to the preferred embodiment of the present lap transporting apparatus, the elevated bridge structure is equipped with a plurality of detector elements which correspond in number and arrangement to the number and arrangement of the work stations of each comber. The active lap operating position and the replacement lap storage position at each work station of each comber is provided with an element detectable by the corresponding detector element of the bridge structure. Preferably, the detectable elements are disposed to be vertically beneath and obscured by a full lap at the associated lap operating position or lap storage position.

As those skilled in the art will recognize, it would be sufficient in the present invention to provide detectable elements only in association with the replacement lap storage positions of the work stations of the combers so that the absence of a full replacement lap at the lap storage position of any comber work station could be identified. However, conventional combers are generally designed for reasons of economical use of space with their lap storage and lap operating positions sufficiently closely spaced that a full replacement lap cannot be supported at a lap storage position until the active lap at the associated lap operating position of the same work station has been depleted by a predetermined amount, e.g., by one-half of the starting full lap diameter. Thus, a full replacement lap should not be deposited at an empty lap storage position until a sufficient period of time elapses after the storage position becomes empty to permit the active lap at the associated operating position to be depleted by the minimal necessary amount. Accordingly, the present invention contemplates that a work station must be detected as having both an empty lap storage position and a sufficiently depleted active lap at the lap operating position before a signal is generated to actuate the assembly of the bridge structure, the trolley, and the gripping mechanism to deliver a full replacement lap to the storage position of the work station.

Preferably, this is accomplished by arranging each detectable element associated with a lap operating position at a horizontal spacing or offset from the disposition of the supporting tube of a lap at the lap operating position in a direction opposite the direction in which the lap is unwound for delivery to the comber. Preferably, the detectable element is offset in this manner by a dimension of approximately one-fourth of the overall diameter of a full replacement lap, so that the detectable element is identifiable from the bridge structure vertically above the comber only after the lap at the operating position has been depleted by about one-half of its original overall diameter.

According to another feature of the present invention, the bridge structure is provided with another detector element for recognizing each comber during movement of the bridge structure serially between the combers. In this manner, it is possible to generate a signal identifying the particular comber, while at the same time the aforementioned plurality of detector elements identifies any work stations to be supplied with full replacement laps. A plurality of elements are arranged in association with the combers to be detectable by the another detectable element, these detectable elements preferably being mounted to the elevated trackway along which the bridge structure travels.

Preferably, the elevated trackway is arranged for traveling movement of the bridge structure in a reciprocating path of movement between a lap storage station and the combers. The bridge structure is provided with two sets of the plural detector elements, which extend outwardly in opposite directions from the bridge structure to enable detection of work stations requiring full replacement laps when the bridge structure is traveling in each direction of its reciprocal travel.

Each detector element preferably comprises an optical device which emits a light beam and each associated detectable element comprises a light reflector element.

DESCRIPTION OF THE PREFERRED EMBODIMENT

Figure 1:
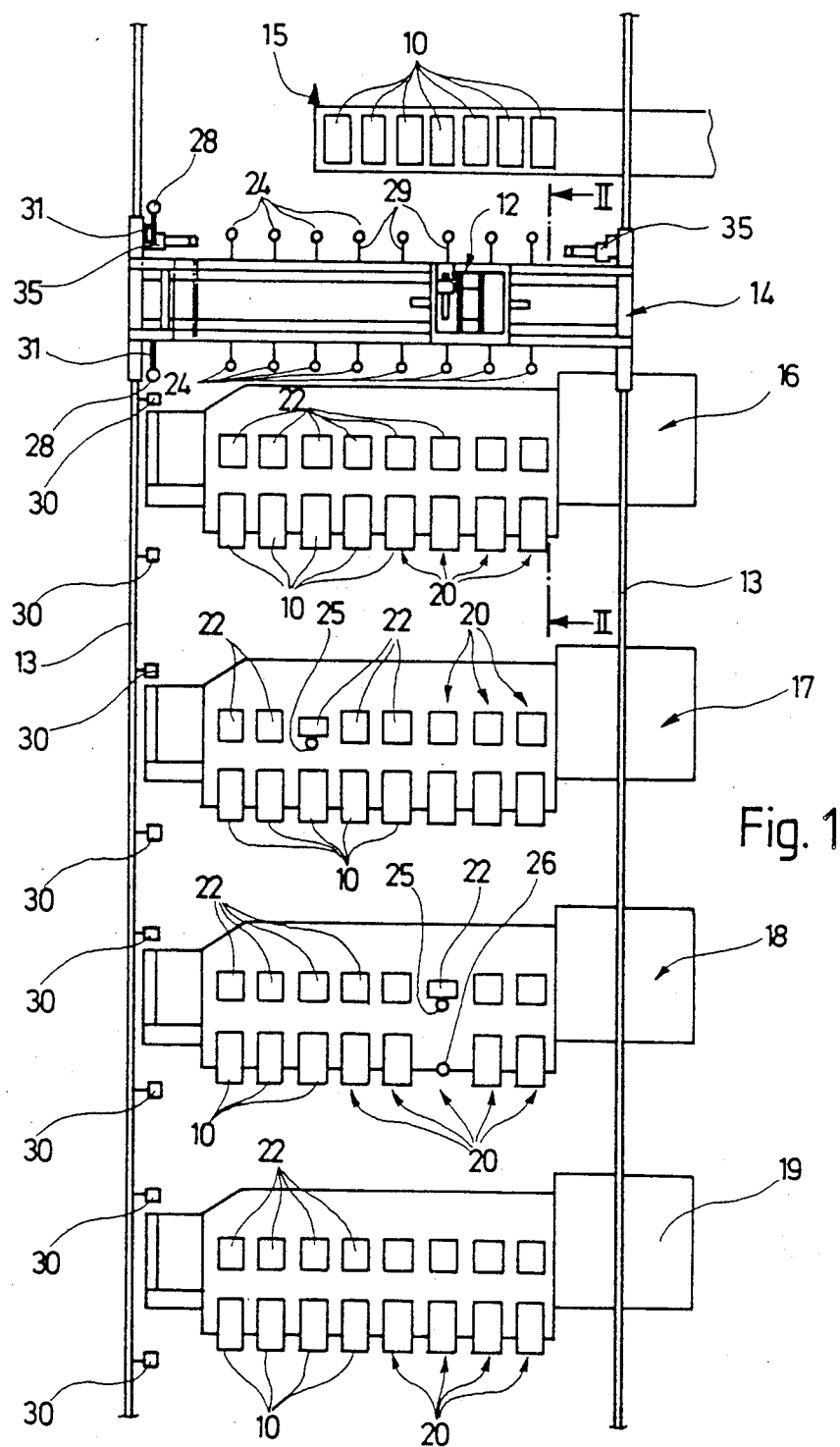
FIG. 1 is a schematic top plan view of the lap transporting apparatus of the present invention arranged in association with a series of several combers to be supplied on a continuing basis with replacement laps.
Figure 2:
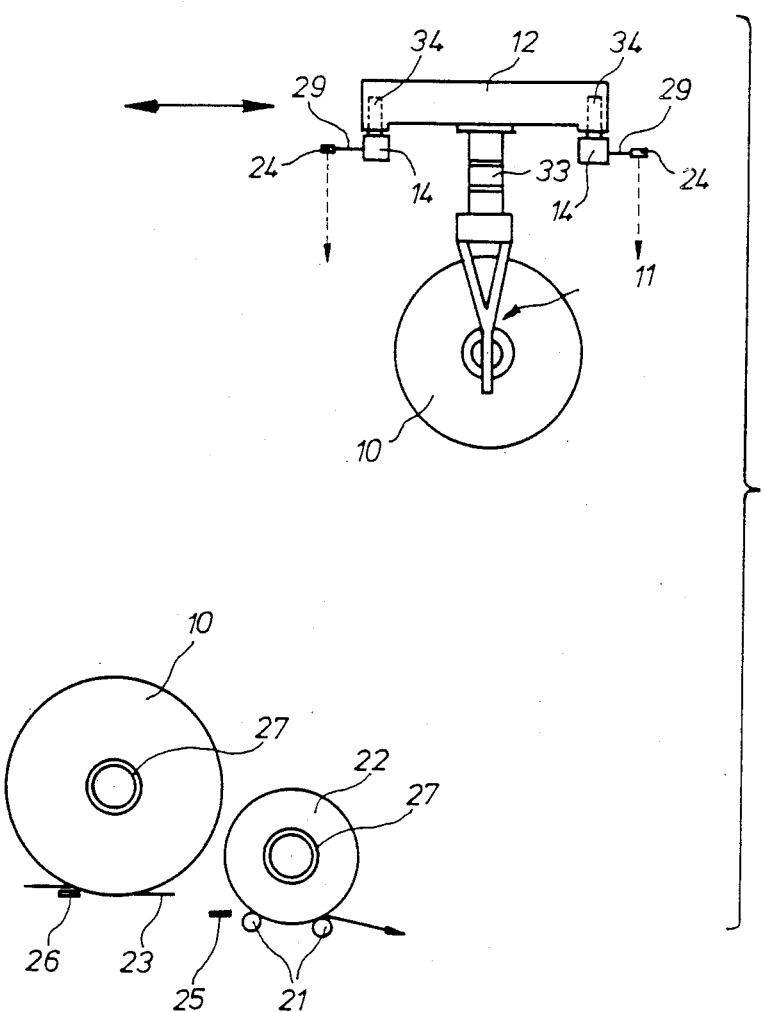
FIG. 2 is a schematic vertical cross-sectional view taken along line II—II of FIG. 1, illustrating the lap transporting apparatus and one work station of one of the combers.

Referring now to the accompanying drawings, four textile combers 16,17,18,19 are shown in FIG. 1 in a typical serial arrangement wherein the combers are spaced from one another with their longitudinal extents in parallel relation. Each comber 16,17,18,19 is provided with eight work stations 20 at each of which a combing operation is performed on a wound textile lap 22 as it is gradually unwound. Each work station 20 of each comber 16,17,18,19 includes a first active working position 21 equipped with a pair of spaced parallel rotating rollers for rotatably supporting a lap 22 for progressive unwinding of the textile lap therefrom for active combing operation thereon, all as best seen in FIG. 2. Each work station 20 of each comber 16,17, 18,19, additionally includes a second inactive storage position 23 equipped with a slightly V-shaped sheet metal plate or shell for supporting a fully wound replacement lap 10 until the active lap at the first working position 21 is fully exhausted, as also best seen in FIG. 2. When the active lap at a work station of one of the combers is completely depleted, a machine operator removes its central supporting tube 27 and manually transfers the full replacement lap 10 from the storage position 23 to the active working position 21, whereupon the replacement lap 10 begins active unwinding delivery to the comber.

The trackway 13, comprising a pair of longitudinal parallel tracks, is supported at an elevation above the combers 16,17,18,19 and extends transversely with respect to the parallel serial arrangement of the combers with each track at a laterally outward spacing from the work stations 20 of the combers 16,17,18,19. A bridge structure 14 is supported on the trackway 13 for reciprocal traveling movement therealong actuated by drive motors 35 at opposite ends of the bridge structure 14. A trolley 12 is supported by rollers 34 (FIG. 2) on the bridge structure 14 for traveling movement along the length of the bridge structure 14 as actuated by a respective drive motor 38 shown only in FIGS. 3a–3c. In this manner, the bridge structure 14 follows a path of reciprocal movement extending essentially perpendicularly with respect to the combers 16,17,18,19 to travel in series thereover, while the trolley 12 follows a perpendicular path of reciprocal movement extending substantially parallel with respect to the longitudinal extent of the combers 16,17,18,19 to travel in series over the work stations 20 thereof.

As seen in FIG. 2, a lap gripping mechanism 11 is mounted to the trolley 12 by means of an elevating mechanism 33 by which the gripping mechanism 11 can be reciprocably moved vertically between a raised position shown in FIG. 2 and a lowered position (not shown) wherein the gripping mechanism 11 is disposed at the level of the work stations 20 of the combers 16, 17,18,19 for depositing a full replacement lap 10 at a lap storage position 23 of one of the comber work stations 20. The gripping mechanism 11 is provided with a pair of gripper arms arranged for movement toward and away from one another, each arm having an inward projection for insertion into and removal from the interior of a supporting tube 27 of a replacement lap 10 for selectively carrying and releasing a replacement lap 10 for transportation to and deposit at a lap storage position 23 of a work station 20.

A storage station 15 is provided beneath the elevated trackway 13 at one end of the serial arrangement of the combers 16,17,18,19 for maintaining a supply of fully wound laps 10 prepared by a lapper, picker or other suitable lap preparing machine and delivered to the storage station 15 by a conveyor belt. In general operation, the bridge structure 14 travels to a position along the elevated trackway 13 vertically above the lap storage station 15, whereat the elevating mechanism 33 lowers the gripping mechanism 11 to grippingly engage a full replacement lap 10 between the gripping arms of the gripping mechanism 11. The elevating mechanism 33 is then raised and the bridge structure 14 is actuated to travel to a position immediately above one of the combers 16,17,18,19 having an empty lap storage position 23 to be supplied with the full replacement lap 10. The trolley 12 is moved along the bridge structure 14 to a position immediately above the work station 20 having the empty lap storage position, at which the lifting mechanism 33 lowers the gripping mechanism 11 to the lap storage position 23 and releases the full replacement lap 10 from the gripping arms of the gripping mechanism 11 to deposit the full replacement lap 10 at the lap storage position 23.

According to the present invention, the bridge structure 14 is provided with a novel control system capable of recognizing the work stations 20 of the combers 16,17,18,19 at which a full replacement lap is required and, in turn, controlling the drive motors 35 of the bridge structure 14, the drive motor 38 of the trolley 12, and the elevating mechanism 33 and the gripping arms of the gripping mechanism 11 to execute transportation of a full replacement lap from the lap storage station 15 to each appropriate work station 20.

Figure 3A:
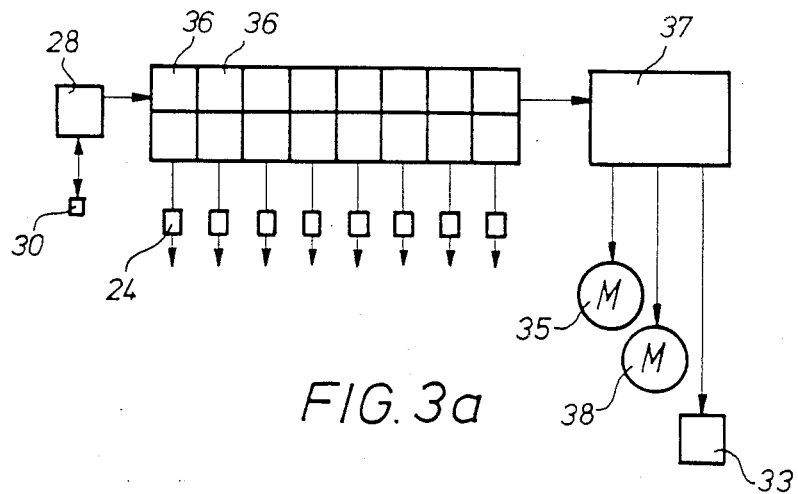
FIGS. 3a, 3b and 3c are schematic block wiring diagrams of the lap transporting apparatus illustrated in differing modes of operation.
Figure 3B:
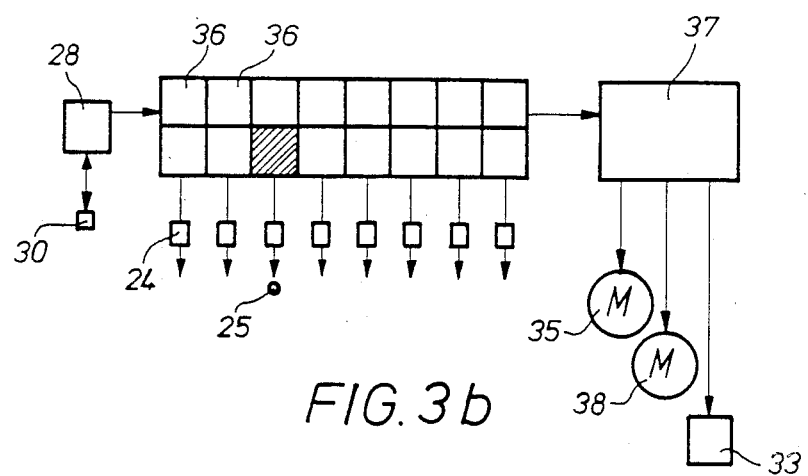
Figure 3C:
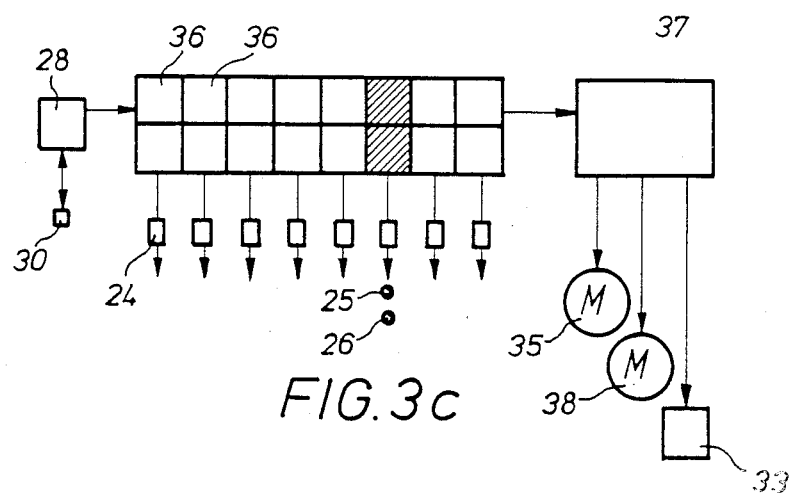

To this end, the bridge structure 14 is provided with a controller 37, shown only in FIGS. 3a-3c, for controlling actuation of the drive motors 35 of the bridge structure 14, the drive motor 38 of the trolley 12, and the elevating mechanism 33 and gripping arms of the gripping mechanism 11 in relation to detector elements 24 and 28 mounted on the bridge structure 14. Two sets of the detector elements 24 are respectively mounted at opposite sides of the bridge structure 14 on arms 29 extending outwardly from the bridge structure 14 in the opposite directions of reciprocal traveling movement thereof. The detectors 24 in each set correspond in number and spaced arrangement to the number and spaced arrangement of the work stations 20 of the combers 16,17, 18,19, so that each detector 24 is located in a common vertical plane with one corresponding work station 20 of each comber 16,17,18,19. One set of the detectors 24 is operative when the bridge structure 14 is traveling in one direction along the trackway 13 while the other set of detector elements 24 is operative when the bridge structure 14 is traveling in the opposite direction along the trackway 13.

Each active lap working position 21 and each lap storage position 23 of each work station 20 of each comber 16,17,18,19 is provided with a respective element 25 or 26 which is detectable by the associated detector elements 24 on the bridge structure 14. Preferably, the detector elements 24 are optical devices such as light probes operative to emit and receive a beam of light, while the detectable elements 25,26 are compatible light reflector elements.

The bridge structure 14 is also provided with a pair of the detector elements 28 mounted on respective arms 31 which project outwardly from opposite sides of the bridge structure 14 in the opposite reciprocal directions of movement thereof. Associated detectable elements 30 are attached to the elevated trackway 13 at each opposite side of each comber 16,17,18,19. In this manner, the detector elements 28 are enabled to identify the location of each comber 16,17,18,19 during traveling movement of the bridge structure 14 along the trackway 13. Preferably, the detector elements 28 are optical devices of the same type as the detector elements 24 and the detectable elements 30 are light reflector elements of the same type as the detectable elements 25,26.

As best seen in FIG. 2, the detectable elements 25,26 are located at each work station 20 of each comber 16,17,18,19 vertically beneath the respective areas occupied by an active lap 22 and a full replacement lap 10 at the associated active lap working position 21 and lap storage position 23 of the work station 20 so that the detectable elements 25,26 are obscured by a full lap at the associated working or storage position 21,23 from detection by the detector elements 24 of the bridge structure 14 when positioned directly vertically above the detectable elements 25,26. The detectable element 25 is disposed at a horizontal spacing from the disposition of the supporting tube 27 of an active working lap 22 at the working position 21 in the direction opposite the direction of comber unwinding of the lap 22 from the tube 27. Preferably, the detectable element 25 is offset from the central axis of the tube 27 by a dimension approximately one-fourth of the overall diameter of a full lap 10. Thus, the detectable element 25 is exposed for reflectance of light from the associated detector element 24 on the bridge structure 14 when the lap 22 has been depleted to approximately one-half of its original full diameter. The detectable element 26 is disposed in association with the lap storage position 23 to be exposed for reflectance of light from the associated detector element 24 only when a full replacement lap 10 is absent from the storage position 23.

The transporting apparatus initially begins operation at the lap storage station 15 whereat the controller 37 actuates the elevating mechanism 33 to lower the gripping mechanism 11 to its lowered position whereat the gripping arms of the gripping mechanism 11 are actuated to grippingly engage a full replacement lap 10. The elevating mechanism 33 is then returned to its raised position and the controller 37 actuate the drive motors 35 of the bridge structure 14 to cause the bridge structure 14 to follow a reciprocating path of monitoring travel back-and-forth along the trackway 13 in series over the combers 16,17,18,19. During traveling movement of the bridge structure 14, the detector element 28 extending forwardly in the direction of travel of the bridge structure 14 recognizes in sequence the series of detectable elements 30 and transmits corresponding signals to the controller 37 to identify each comber 16,17,18,19 in sequence.

As the bridge structure 14 passes over each comber, the detectors 24 recognize each detectable element 25,26 which is not obscured by a lap at the associated working and storage positions 21,23. Each detector 24 transmits an impulse to an associated meter 36 for each detectable element 25,26 recognized by the detector element 24, the meter 36 being operable to count the number of impulse signals received from the detector element 24. A single impulse generated by a detector element 24 indicates that the active lap 22 at the lap working position 21 of the associated work station 20 has been depleted to less than half of its original full diameter but that a full replacement lap 10 remains in the associated lap storage position 23 of the work station. Accordingly, a full replacement lap 10 is not required at the work station and, therefore, the meter 36 does not transmit any signal to the controller 37. On the other hand, however, two signals by a detector element 24 to its associated meter 36 indicates that a full replacement lap 10 is absent from the lap storage position 23 of the associated work station 20 and at the same time the active lap 22 at the working position 21 of the work station 20 has been depleted to less than half its original full diameter. Accordingly, the associated meter 36 transmits a signal to the controller 37, indicating the work station 20 at which a full replacement lap 10 is required.

The controller 37 deactuates the drive motors 35 of the bridge structure 14 to stop the bridge structure 14 over the associated comber and then actuates the drive motor 38 of the trolley 12 to position the gripping mechanism 11 immediately above the particular work station 20 at which a full replacement lap 10 is required. Once the trolley 12 is stopped above the appropriate work station 20, the controller 37 actuates the elevating mechanism 33 to lower the gripping mechanism 11 to its lowered position at the work station and then actuates the gripping arms of the gripping mechanism 11 to release the full replacement lap 10 held thereby so as to deposit the lap 10 at the lap storage position 23 of the work station 20.

The elevating mechanism 33 is then returned to its raised position and the controller 37 reactuates the drive motors 35 to cause the bridge structure 14 to return to the lap storage station 15 to engage another full replacement lap 10 with the gripping mechanism 11, after which the operation of the transporting apparatus as described is repeated. As the bridge structure 14 travels over each comber in sequence, the leading detector element 28 recognizes the detectable element 30 immediately following the comber, whereupon the counting meters 36 are erased.

The above-described manner of operation may be understood with reference to FIGS. 1 and 3a–3c. As the bridge structure 14 begins its monitoring travel along the trackway 13 after having acquired a full replacement lap 10 at the lap storage position 15, the bridge structure 14 initially passes over the comber 16. The leading detector 28 initially recognizes the detectable element 30 on the trackway 13 immediately in advance of the comber 16. FIG. 3a corresponds to the comber 16 of FIG. 1. As will be seen, none of the active laps 22 at the working positions 21 of the working stations 20 have been sufficiently depleted to uncover any of their associated detectable elements 25 and, additionally, a full replacement lap 10 is supported at each storage position 23 of each working station 20. Accordingly, none of the detectable elements 25,26 are recognized by the detector elements 28 so that no counting impulses are delivered to the meters 36. The bridge structure 14 therefore continues traveling movement past the comber 16 and, in doing so, the detector element 28 recognizes the detectable element 30 immediately following the comber 16 and transmits an erase signal to the counting meters 36.

As the bridge structure 14 approaches the next comber 17 in sequence, the detector element 28 recognizes the next succeeding detectable element 30 on the trackway 13 immediately preceding the comber 17, reactivating the counting meters 36. FIG. 3b corresponds to the comber 17 of FIG. 1. As will be recognized, one of the active laps 22 at one of the working stations 20 of the comber 17 has been depleted to less than half of its original full diameter, thereby uncovering the associated detectable element 25. The respective detector element 24 accordingly recognizes the uncovered detectable element 25 and delivers an impulse to the associated counting meter 36. However, a full replacement lap 10 is supported at the lap storage position 23 of the respective work station 20 so that the associated detectable element 26 remains obscured and, accordingly, no additional signal is transmitted by the detector element 24 to the associated meter 36. Thus, no signal is delivered to the controller 37 and the bridge structure 14 continues its traveling movement past the comber 17. When the detector element 28 recognizes the detectable element 30 immediately following the comber 17, the detector 28 transmits an erase signal to the meters 36 to clear the single impulse counted at the comber 17.

As the bridge structure 14 approaches the next succeeding comber 18, the detector element 28 recognizes the next detectable element 30 immediately preceding the comber 18 and reactivates the counting meters 36. FIG. 3c corresponds to the comber 18 of FIG. 1. As will be recognized, at one working station of the comber 18, the active lap 22 at the working position 21 has been depleted sufficiently to uncover the associated detectable element 25 and a full replacement lap 10 is absent from the associated lap storage position 23 so that the associated detectable element 26 is also uncovered. Accordingly, the associated detector element 24 recognizes each detectable element 25,26 and transmits two impulses to the associated meter 36, indicating that a full replacement lap 10 is required at the respective work station. The respective counting meter 36 accordingly delivers a signal to the controller 37 which deactuates the drive motors 35 to stop the bridge structure 14 immediately above the comber 18. The drive motor 38 to the trolley 12 is actuated to position the gripping mechanism 11 immediately above the work station 20 requiring a full replacement lap 10. The elevating mechanism 33 is actuated to lower the gripping mechanism 11 whose gripping arms are operated to release the full replacement lap 10 from the gripping mechanism 11 onto the lap storage position 23 of the work station 20. The elevating mechanism 33 is then returned to its raised position and the drive motors 35 are reactivated to return the bridge structure 14 to the lap storage station 15 to obtain another full replacement lap 10, after which the operation is repeated.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purpose of providing a full and enabling disclosure of the invention. The foregoing disclosure is not intended or to be construed to limit the present invention or otherwise to exclude any such other embodiment, adaptations, variations, modifications and equivalent arrangements, the present invention being limited only by the claims appended hereto and the equivalents thereof.

I claim:

1. Apparatus for transporting textile laps to a plurality of combers, each comber having a lap operating position for supporting an active lap in combing operation and a lap storage position for supporting a full lap for replacement of the active lap upon exhaustion, said lap transporting apparatus comprising a lap storage station for storing a supply of full replacement laps, an elevated bridge structure movable in series between the lap storage station and the plural combers, a trolley movable along the bridge structure, and a lap gripping device mounted on the trolley for gripping a lap at the storage station for transporting the lap to one of the combers, the bridge structure having means for detecting empty lap storage positions of the combers to be supplied with a full replacement lap.

2. Apparatus for transporting textile laps according to claim 1 and characterized further in that each of the combers includes a plurality of work stations each having a lap operating position and a lap storage position, the bridge structure comprising a plurality of detector elements corresponding in number and arrangement to the number and arrangement of the work stations of each comber.

3. Apparatus for transporting textile laps according to claim 2 and characterized further in that each lap operating position and each lap storage position of each work station of each comber has an element detectable by the corresponding detector element of the bridge structure, each detectable element being disposed to be vertically beneath and obscured by a full lap at the associated lap operating or storage position.

4. Apparatus for transporting textile laps according to claim 2 or 3 and characterized further in that each lap is wound on a central supporting tube, each detectable element associated with a lap operating position being disposed at horizontal spacing from the disposition of the supporting tube of a lap at the lap operating position in a direction opposite the direction of comber unwinding of the lap from the tube.

5. Apparatus for transporting textile laps according to claim 1 and characterized further in that the bridge structure includes another detector element for recognizing each comber during movement of the bridge structure serially between the combers.

6. Apparatus for transporting textile laps according to claim 5 and characterized further by a plurality of elements arranged in association with the combers to be detectable by the another detector element.

7. Apparatus for transporting textile laps according to claim 2 and characterized further in that each detector element is supported by an arm extending outwardly from the bridge structure in the direction of its movement.

8. Apparatus for transporting textile laps according to claim 7 and characterized further in that the bridge structure is movable in a reciprocating path of travel between the lap storage station and the combers, the bridge structure having two sets of the detector elements extending outwardly in opposite directions for operation in each direction of reciprocal travel of the bridge structure.

9. Apparatus for transporting textile laps according to claim 3 and characterized further in that each detector element comprises an optical device emitting a light beam and each detectable element comprises a light reflector element.

10. Apparatus for transporting textile laps according to claim 6 and characterized further in that the another detector element comprises an optical device emitting a light beam and each detectable element comprises a light reflector element.

* * * * *